4 Sheets—Sheet 1.

T. POWELL.
Machine for Cutting Green Corn from the Cob.

No. 208,423. Patented Sept. 24, 1878.

WITNESSES.
James B. Ligius
R. P. Daggett

INVENTOR.
Thomas Powell,
PER
C. Bradford,
ATTORNEY.

N. PETERS, PHOTO-LITHOGRAPHER, WASHINGTON, D. C.

4 Sheets—Sheet 2
T. POWELL.
Machine for Cutting Green Corn from the Cob.
No. 208,423.   Patented Sept. 24, 1878.
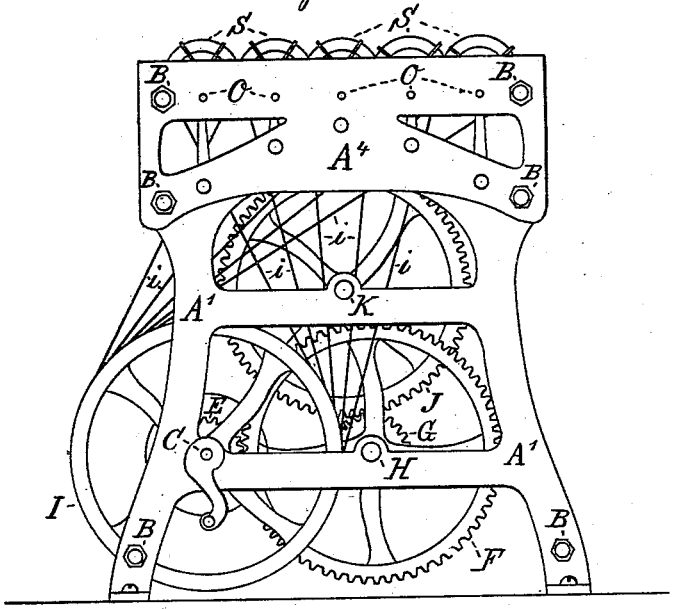
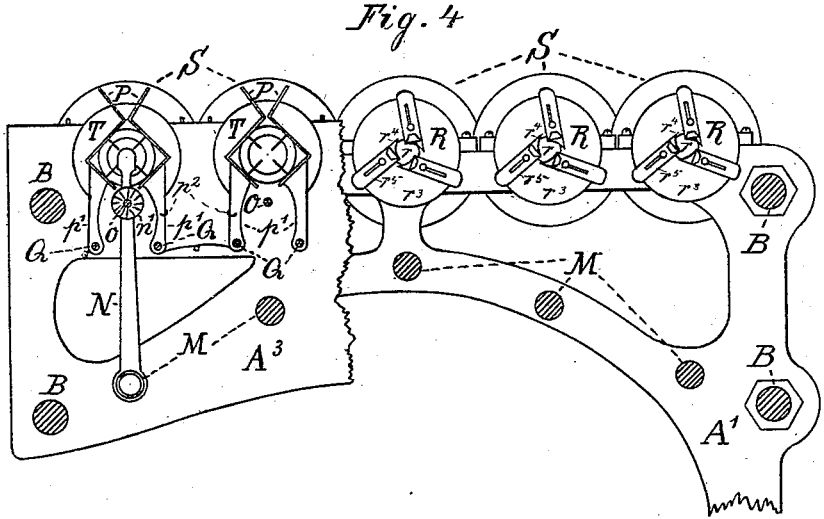
WITNESSES.
James B. Lizius
R. P. Daggett
INVENTOR.
Thomas Powell,
PER
C. Bradford
ATTORNEY.

4 Sheets—Sheet 3.

T. POWELL.
Machine for Cutting Green Corn from the Cob.
No. 208,423. Patented Sept. 24, 1878.

WITNESSES.
James B Lizius
R. P. Daggett

INVENTOR.
Thomas Powell,
PER
C. Bradford
ATTORNEY.

N. PETERS, PHOTO-LITHOGRAPHER, WASHINGTON, D C.

T. POWELL.
Machine for Cutting Green Corn from the Cob.
No. 208,423. Patented Sept. 24, 1878.
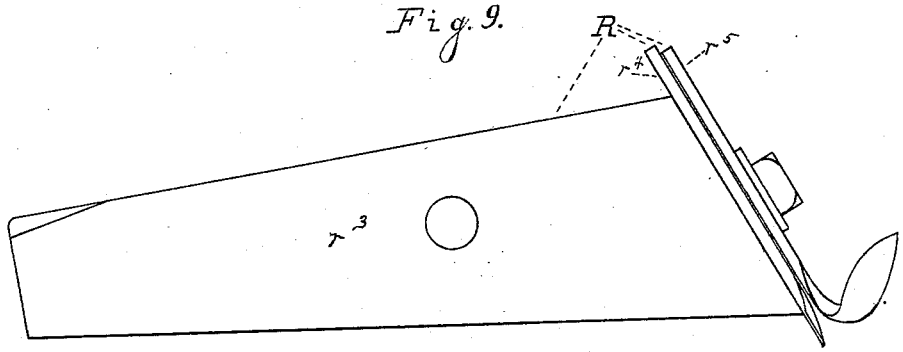
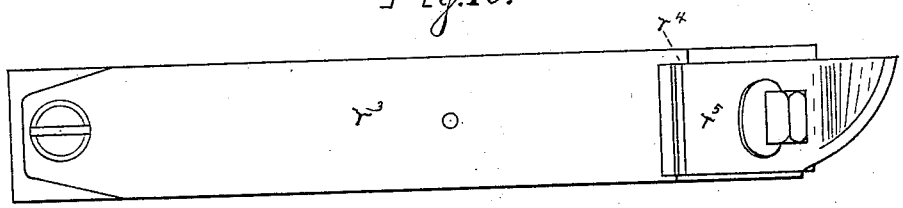
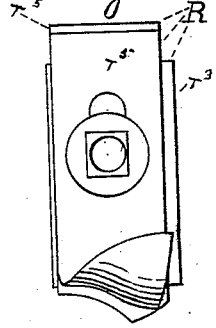 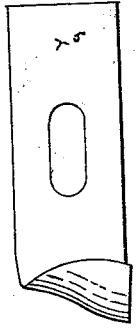 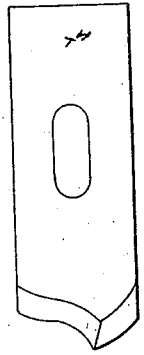
WITNESSES.
Wm. E. Moore
Wm. J. Millner
INVENTOR.
Thomas Powell,
PER C. Bradford
ATTORNEY.

UNITED STATES PATENT OFFICE.

THOMAS POWELL, OF MARTINSVILLE, INDIANA.

IMPROVEMENT IN MACHINES FOR CUTTING GREEN CORN FROM THE COB.

Specification forming part of Letters Patent No. 208,423, dated September 24, 1878; application filed June 7, 1878.

*To all whom it may concern:*

Be it known that I, THOMAS POWELL, of the town of Martinsville, county of Morgan, and State of Indiana, have invented certain new and useful Improvements in Green-Corn-Cutting Machines, of which the following is a specification:

Reference is made to the accompanying drawings, which are made a part hereof, and on which similar letters of reference indicate similar parts.

Figure 1:
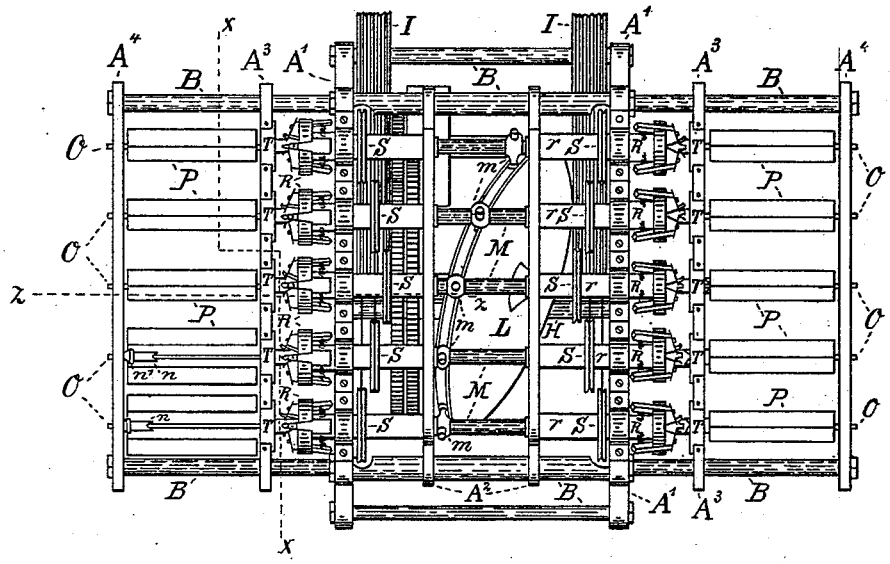
Figure 2:
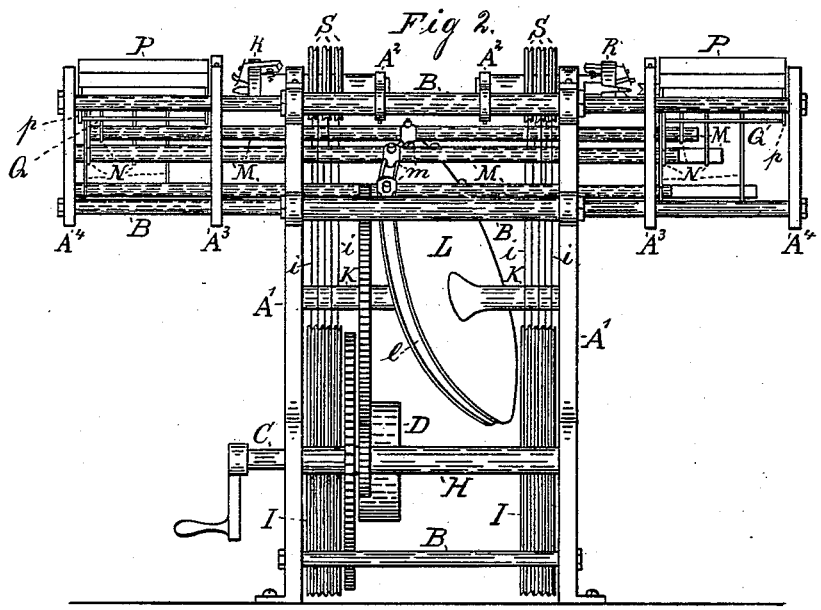
Figure 5:
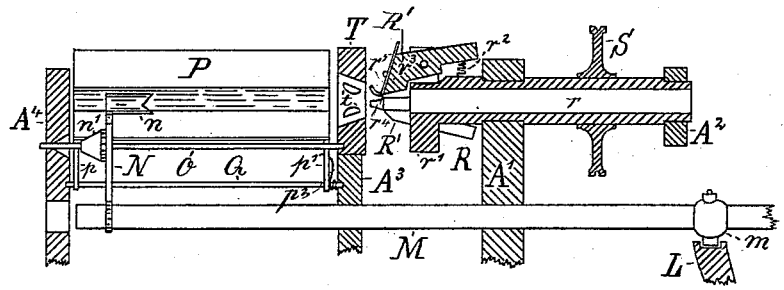
Figure 6:
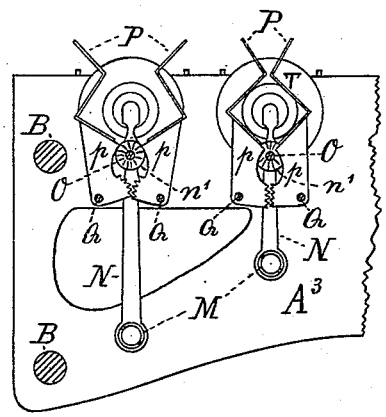
Figure 7:
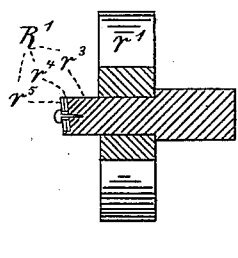
Figure 8:
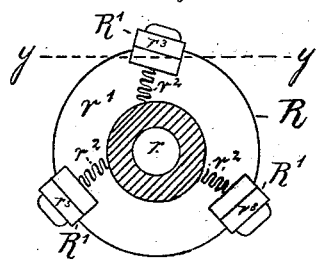

Figure 1 is a top or plan view of my improved machine. Fig. 2 is a side elevation thereof. Fig. 3 is an end elevation. Fig. 4 is a transverse vertical section of the principal part of the machine, as seen from the dotted line $x\ x$ in Fig. 1, when looking toward the central part of the machine. Fig. 5 is a longitudinal vertical section of the receptacle P, the carrying mechanism, and the cutter-head R on the dotted line $z\ z$ in Fig. 1. Fig. 6 is a view of two of the receptacles P, as seen when looking toward the end of the machine, with the piece of frame-work $A^4$ removed, one being shown with the two halves contiguous, as in their ordinary position, and the other showing them as when forced apart by the device $n'$. Fig. 7 is a horizontal section of one of the cutters $r^1$, as seen from the dotted line $y\ y$ in Fig. 8, showing the arrangement of the knives and the means by which they are fastened to their stems. Fig. 8 is a rear view of the cutter-head, showing the relative position of the stems of the cutters and the springs by which they are caused to hold the knives to their work. Fig. 9 is a side elevation of one of the cutters $R'$. Fig. 10 is a top view, and Fig. 11 is a front end view, of the same cutter. Fig. 12 is a plan view of the cutting-knife $r^5$, and Fig. 13 is a similar view of the gage knife or bit $r^4$. A reference to Figs. 4, 5, 7, and 8 will show the location and arrangement of this cutter to the cutter-head and to the other parts of the machine.

Referring to these drawings, the various parts are marked with letters of reference, as specified in the following description.

Those portions marked A are the frame-work of the machine, which is connected together by the rods B. Where it becomes necessary to distinguish any of the several parts of the frame-work, it is done by the aid of numerals attached to the letters of reference. C is the main shaft, having a pulley, D, thereon, and which is driven by a belt from an engine or some other suitable motive power. On this shaft C are also the pinion E and the large drums I I.

In order that the several parts of the machine may have the proper speed relatively to each other, it is necessary that the shaft K should run much slower than the main shaft C. To accomplish this, a series of gears, E F G J, and a counter-shaft, H, are introduced as a part of the mechanism, and, as shown in the drawings, reduce the speed of the former to the rate of about one revolution to seventeen of the latter.

From the large drums I I on the shaft F to the small pulleys S on the hollow shafts of the cutter-heads run the belts $i$. The cutter-heads R are thus driven at a high rate of speed, making about four revolutions to each one made by the main shaft C, which enables them to do their work with accuracy and without clogging.

The speeds herein mentioned may, of course, be varied as the necessities of the case require, being given simply as an aid in understanding the operation of the machine.

On the shaft K is the cam-shaped disk L, which serves to drive the pistons M. In the edge of this cam is a groove, $l$, which receives the adjustable stud $m$ on the pistons M, by means of which it is enabled to impart to said pistons a reciprocating motion as it revolves with the shaft K. Upon the pistons M, at suitable distances from their ends, are the upwardly-projecting arms N, carrying the toothed pusher-heads $n$ and the cone or wedged-shaped device $n'$, the former of which is for the purpose of forcing the ears of corn forward against the cutter-heads, and the latter of which operates to force the jaws of the receptacle P open as it comes in contact with the downwardly-projecting arms $p\ p$ in its rearward movement.

The receptacle P consists of two plates of metal, bent to a double angle, so as to form a trough-like hopper, in which to lay the ears of corn, and a box-like receptacle to hold them while being forced forward by the toothed head $n$. It is mounted on arms $p$ $p$ and $p^1$ $p^1$, which are in turn mounted on the pivot-rods Q. The arms $p$ $p$ are provided at their lower ends with toothed segments, (see Fig. 6,) which engage with one another and insure the uniform movement of the two sides. A spring, $p^2$, keeps the parts together when not forced apart by the device $n'$.

O is a guide-rod, over which the device $n'$ slides in its forward and rearward movements, and which serves to keep the upwardly-projecting arm N in place and to steady and guide its movements and those of its attachments. It also helps to form a bottom for the receptacle P, preventing the ears from falling through while said receptacle is open.

R R are the cutter-heads of the machine, which are each composed of a hollow shaft, $r$, having a flange, $r^1$, around its forward end, cutters R' set into suitable recesses in the flange, where they are pivoted, and springs $r^2$ placed under the rear ends of the cutters, which are thereby kept firmly pressed down upon the corn while it is being cut. Instead of using these springs, the rear portion of the cutters might be made of considerable weight, when they would operate to close their forward ends by centrifugal force. Each of the cutter-heads has preferably three of the cutters R', each set at a slight angle from the center of the head, and each provided with two knives, $r^4$ and $r^5$, which, with the stem $r^3$, constitute the entire cutter. The knives $r^4$ ride the cob as it passes through, expanding the head as the cob increases in size, thus acting as a gage to prevent the knives $r^5$ from cutting too deep. Being set slightly angling, they also form a screw, which aids in drawing the cob and in regulating its speed in its passage through the head. The other knives, $r^5$, are so set as to cut the valuable part of the corn into thin slices and remove it from the cob cleanly and perfectly without disturbing the "chit" or extreme point of the kernel, which is of no value for this purpose. The cob itself passes on through the hollow shaft $r$, and is discharged from its rear end, whence it is conveyed away by means of a chute or in some other suitable manner.

S S are pulleys on the hollow shafts $r$, to which run belts from the drums I, by means of which motion is imparted to the cutter-heads.

T T are knife-bearing guides set in the bar $A^3$ of the frame-work, through which the ears of corn are forced as they pass from the receptacle P to the cutter-heads. In these guides are set the adjustable knives or spurs $t$, (see Fig. 5,) which enter the sides of the ear of corn as its passes through, and prevent it from being turned by the action of the cutter-head.

The foregoing description has only, for the most part, described the machinery necessary for a single machine, though a tenfold one is illustrated in the drawings. It will, of course, be understood that any number of cutter-heads and other duplicated parts may be used that is desired without in any manner affecting the scope or character of my invention.

It is well known to those acquainted with the business of drying and canning corn that the ordinary method of cutting it from the cob by hand with common knives has been attended with great waste. It has also been impossible by such methods to produce any uniformity in the thickness of the pieces, and consequently in the cooking or drying of them.

It has been my object, in constructing the hereinbefore-described machine, to furnish a means by which said disadvantages could be obviated.

The operation of my said machine may be briefly recapitulated as follows: In the hopper-like part of the receptacles P, while the same remain unopened, are placed ears of green corn, preferably with their points toward the cutter-heads. As the machine is actuated the pistons M are forced back, one after another, by the operation of the cam L. The cone-shaped devices $n'$ on the arms N of said pistons then operate as wedges against the arms $p$ $p$, forcing them apart, and with them the sides of the receptacle P, allowing the ear of corn to fall from its upper into its lower part. As the piston commences to move on its return, the sides of the receptacle close upon the ear, holding it in the proper position, while the head $n$ pushes it before it through the guide T into the cutter-head R. As the ear advances the kernels are cut from the cob by the knives $r^5$, which leaves them in thin pieces of even thickness and in the best possible condition for canning or drying. The cut corn falls into a suitable receptacle placed underneath the cutter-heads, and the cobs pass on through the hollow shaft $r$, from the rear of which they are conveyed in any suitable manner.

Having thus fully described my said invention, what I claim as new, and desire to secure by Letters Patent, is—

1. The revolving cutter-head R, composed of the hollow cylinder or shaft $r$, and carrying the self-adjustable cutters R', substantially as herein shown and specified.

2. The cutter R' of the cutter-head, composed of the pivoted stem $r^3$, the gage knife or bit $r^4$, and the cutting-knife $r^5$, substantially as herein shown and specified.

3. In a green-corn-cutting machine, the guide-head T, having holding spurs or knives $t$ $t$ therein, substantially as herein shown and specified.

4. In a green-corn-cutting machine, the receptacle P, formed of two sides, so constructed as to hold the corn and to open and close automatically, substantially as herein shown and specified.

5. In combination with the arms $p$ $p$ of the receptacle P, the cone or wedge shaped device $n'$, for the purpose of forcing said arms apart and the said receptacle open, substantially as shown and specified.

6. The reciprocating piston-rod M, bearing the upwardly-projecting arm N, provided with the head $n$, for the purpose of forcing the ears of corn forward against the cutter-heads, substantially as shown and specified.

7. In a green-corn-cutting machine, the gage knife or bit $r^4$, constructed and operating substantially as herein shown and described, and for the purpose herein specified.

8. In a green-corn-cutting machine, the combination of the cam L, piston-rod M, arm N, and guide-rod O, substantially as herein shown and specified.

In witness whereof I have hereunto set my hand and seal at Indianapolis, Indiana, this 5th day of June, A. D. 1878.

THOMAS POWELL. [L. S.]

In presence of—
 C. BRADFORD,
 WM. J. MILLNER.